(12) United States Patent
Finkelstein (10) Patent No.: US 7,386,548 B2
(45) Date of Patent: *Jun. 10, 2008

(54) METHOD AND DATA STRUCTURE FOR PERFORMING REGULAR EXPRESSION SEARCHES IN A FIXED LENGTH WORD LANGUAGE

(75) Inventor: Amit Finkelstein, Haifa (IL)

(73) Assignee: Microsoft Corporation, Redmond, WA (US)

( * ) Notice: Subject to any disclaimer, the term of this patent is extended or adjusted under 35 U.S.C. 154(b) by 281 days.

This patent is subject to a terminal disclaimer.

(21) Appl. No.: 11/271,934

(22) Filed: Nov. 10, 2005

(65) Prior Publication Data

US 2006/0074852 A1    Apr. 6, 2006

Related U.S. Application Data

(63) Continuation of application No. 10/207,423, filed on Jul. 29, 2002, now Pat. No. 6,996,562.

(51) Int. Cl.
*G06F 17/30*    (2006.01)

(52) U.S. Cl. .............................. 707/6; 707/102; 707/4

(58) Field of Classification Search ................ 707/1–7, 707/100–102, 104.1; 704/9
See application file for complete search history.

(56) References Cited

U.S. PATENT DOCUMENTS

| | | | |
|---|---|---|---|
| 6,691,168 B1 * | 2/2004 | Bal et al. ..................... | 709/238 |
| 6,742,164 B1 * | 5/2004 | Gillam ....................... | 715/531 |
| 6,748,390 B2 | 6/2004 | Navoni et al. | |
| 6,856,981 B2 * | 2/2005 | Wyschogrod et al. ......... | 706/48 |
| 2002/0069232 A1 * | 6/2002 | Direen et al. ............... | 708/400 |
| 2002/0118682 A1 * | 8/2002 | Choe ..................... | 370/395.31 |

* cited by examiner

*Primary Examiner*—Debbie M Le
(74) *Attorney, Agent, or Firm*—Lee & Hayes, PLLC (57) ABSTRACT

Given a language with all words in a fixed length, and a set of regular expressions composed only from characters in the alphabet of the language or the "?" sign (any single character), the system of the invention defines a data structure that is used to efficiently find the set of matching regular expressions for a given query word. The system may be adjusted by appropriate selection of a control variable to vary the storage space required and the search time necessary to complete the query. Specifically, the system of the present invention provides a space versus time trade-off between the storage space required for the data structures of the present invention and the amount of time to search those data structures to determine the matching set of regular expressions.

15 Claims, 10 Drawing Sheets

| | J=1 | J=2 | J=3 | J=4 | J=5 | J=6 | J=7 | J=8 |
|---|---|---|---|---|---|---|---|---|
| K=0 | 01 | 11 | 01 | 11 | 10 | 11 | 10 | 11 |
| K=1 | 10 | 00 | 10 | 00 | 01 | 00 | 01 | 00 |

| | J=9 | J=10 | J=11 | J=12 | J=13 | J=14 | J=15 | J=16 |
|---|---|---|---|---|---|---|---|---|
| K=0 | 11 | 10 | 11 | 01 | 00 | 00 | 01 | 01 |
| K=1 | 00 | 01 | 00 | 10 | 11 | 11 | 10 | 10 |

| | J=17 | J=18 | J=19 | J=20 | J=21 | J=22 | J=23 | J=24 |
|---|---|---|---|---|---|---|---|---|
| K=0 | 01 | 00 | 11 | 11 | 10 | 00 | 11 | 11 |
| K=1 | 10 | 11 | 00 | 00 | 01 | 11 | 10 | 10 |

| | J=25 | J=26 | J=27 | J=28 | J=29 | J=30 | J=31 | J=32 |
|---|---|---|---|---|---|---|---|---|
| K=0 | 11 | 11 | 11 | 11 | 11 | 11 | 11 | 11 |
| K=1 | 11 | 11 | 11 | 11 | 11 | 11 | 11 | 11 |

METHOD AND DATA STRUCTURE FOR PERFORMING REGULAR EXPRESSION SEARCHES IN A FIXED LENGTH WORD LANGUAGE

CROSS-REFERENCE TO RELATED APPLICATIONS

This application is a continuation application claiming priority from U.S. patent application Ser. No. 10/207,423 entitled "Method and Data Structure for Performing Regular Expression Searches in a Fixed Length Word Language," by Finkelstein, having a filing date of Jul. 29, 2002 now U.S. Pat. No. 6,996,562, and is commonly assigned herewith. The contents of the aforementioned application are fully incorporated herein by reference.

BACKGROUND OF THE INVENTION

In computerized systems and networks the control of data and packet flow between users in the network and the outside world often provides a first line of defense against malicious nodes, and provides a measure of administrative control. Gateways, firewalls, proxies, and network address translators (NAT) etc. are all devices which allow a network administrator to institute various policies and rules that, at least to some extent, provide the control of data and packet flow therethrough. The rules that reflect the administrative policy are typically associated with a packet's source address, destination address, port information, etc., and can designate applicability to groups of addresses to allow communication policy to be applied to nodes within a subnet.

Once the administrator of the policy builds the set of rules or regular expressions to be applied to the packet flow through the network device, these rules are typically placed in a database for retrieval and use by the device. As each packet is processed through the gateway, firewall, etc., the device must check the database to find any and all applicable rules that apply to that packet. Such rules may simply relate to the proper routing of that packet, or may be restrictive in nature, disallowing packet flow between certain addresses or from certain nodes. Once the device has found the applicable rules, these rules are then applied to decide what to do with the packet.

As the size of the network grows and the throughput of information increases, the processing time required to locate and apply these rules may result in information flow delay caused by the gateway device. This lag in processing time may become unacceptably long, especially as the number of rules and the volume of communication traffic increases. In the firewall example, a major component of this processing lag is the search time associated with finding which rules apply to particular IP addresses. While the current IP address system (the dotted quad) provides for $2^{32}$ unique IP addresses, the search delay component associated with IP addresses will only increase as the IPv6 standard substantially increases this number. If the rule is to take both the source address and the destination address into account, then the number of possible combinations rises to $2^{64}$.

Therefore, there exists a need in the art for a method for efficiently searching a data set of fixed length words to find a set of matching regular expressions.

BRIEF SUMMARY OF THE INVENTION

In view of the above, the present invention provides a method for efficiently searching a data set of fixed length words to find the set of matching regular expressions associated therewith. In particular, given a language with all words in a fixed length, and a set of regular expressions composed only from characters in the alphabet or a wild card (any single character), the method of the present invention defines a data-structure that efficiently finds, i.e. with a small number of instructions, the set of matching regular expressions to the given word. The method of the present invention may be optimized by varying the number and size of the lookup table data structures created to reduce the search time or the memory usage as required for a particular application.

In an initialization phase of one embodiment of the present invention, the method creates a number of lookup tables related to a selected division of the regular expression word. That is, given the length of the regular expression word W, that word is divided into groups of B length, which results in the creation of W/B groups. Each such group is then given its own lookup table. The number of entries in each lookup table is determined by the number of characters L in the alphabet being utilized, e.g. a binary alphabet has L=2, raised to the power B, i.e. $L^B$. Each entry in the lookup table is a bitmap of length N, where N represents the number of regular expressions (rules) that may be applied in the system. Each lookup table entry for each look-up table is then initialized for each regular expression. This initialization sets the bit associated with that regular expression true in the associated entry in the lookup table. All other entries are left in their turned off or false state. Of course, one skilled in the area will realize that negative logic could be applied, resulting in the bits being set in opposite states.

When a query is received, for example when a packet is received having a source address and destination address, the lookup tables are searched to determine if a regular expression exists that should be applied to that particular packet. The search process begins with the creation of a result bitmap of a length N, where each of the N bits indicates the applicability of one of the 1 to N regular expressions. Initially each of the N bits are turned on in the result bitmap. The search method then determines the intersection between the result bitmap and each of the lookup tables generated during the initialization phase. Specifically, a logical AND operation is performed between the result bitmap and the bitmaps in the entry in the lookup table associated with the information in the received packet. The result from this first logical AND operation is then stored in the result bitmap. This result bitmap is then logically ANDed with the next lookup table and the results stored in the result bitmap. This process continues with each associated entry in each of the lookup tables. Once this process is complete the result bitmap is used to return the set of regular expressions corresponding to the bits which remain turned on in the result bitmap.

Through the method and with the data structures of the present invention, an optimization or selection can be made with regard to the amount of storage space required versus the look-up time to resolve the associated regular expressions for a particular query. That is, through proper selection of the grouping variable B, the method of the present invention may be optimized to minimize the amount of space required for the look-up tables by selecting B=1. That is, if each character of the query word is given its own lookup table, the amount of space required to store all the lookup tables and the bitmaps therein is minimized. However, the number of operations that must be performed to search each of the W lookup tables is maximized. For example, 32 separate lookup tables, and therefore 32 separate logical AND operations must be performed if the word length is 32 bits, as is the case with a dotted quad IP address in the binary language.

The method of the present invention may also be optimized for a minimal search time, recognizing the trade-off with respect to the amount of space required to store the lookup table to reduce the number of operations to a minimum. In its limit, the grouping B is selected to be equal to the world length W, thereby requiring only a single lookup table. However, while only a single logical AND operation is required to determine which regular expressions are to be associated with a particular query word, the amount of space required to store the single lookup table is maximized. For example, such a lookup table for a 32 bit IP address will require $2^{32}$ entries in the table. Since each entry holds a bitmap of length N, the amount of storage space required is N times $2^{32}$. Through the method of the present invention the space versus time trade-off can be optimized for a particular application, recognizing the inverse relationship between the search time and storage space required by the data structures of the present invention.

In a language using an alphabet having a first number of characters L forming words of a fixed length W, and a second number N of regular expressions composed only from the characters in the alphabet and the '?' sign, the invention provides a method of finding a set of matching regular expressions associated with a given query word. In one embodiment this method comprises the steps of selecting a base B from 1 to W to divide the words of length W into J=W/B groups and creating a lookup table for each of the J groups. The lookup table for each of the J groups has K=$L^B$ entries, each of which being a bitmap of length N. The method then seeds each lookup table for each regular expression from I=1 to I=N. Finally, the method searches each lookup table to determine the set of regular expressions that match the query word.

Preferably, the step of seeding comprises the steps, for each regular expression from I=1 to I=N, for each lookup table from J=1 to J=W/B, and for each entry from K=1 to K=$L^B$, of setting an $I^{th}$ bit in the bitmap in the $K^{th}$ entry true when a value of the $J^{th}$ group of the $I^{th}$ regular expression matches K and when the value of the $J^{th}$ group of the $I^{th}$ regular expression is equal to '?', which stands for any single character in the alphabet. That is, the match is done by converting the K index to a word of B characters representing the K number. As an example, assume that K is 53, B is 8, and the alphabet is {0, 1}. This conversion results in "00110101." Now, the method takes the B characters in the $I^{th}$ regular expression starting from the J*B character. In the first iteration the method will take the first B characters, the next iteration will take the next group of B characters, etc. If the regular expression is "?01?010" then the matching is performed by comparing each character in the K conversion with the corresponding character from the regular expression. In this particular example the following comparisons are made:

1. ('0'=='?')
2. ('0'=='0')
3. ('1'=='1')
4. ('1'=='?')
5. ('0'=='0')
6. ('1'=='1')
7. ('0'=='0')
8. ('1'=='?')

A character comparison is true either if the characters are equal or if the character from the regular expression is "?". In the above example, the comparisons numbered 2, 3, 5, 6, and 7 are considered equal because the characters are equal, and the comparisons 1, 4, and 8 are equal because the regular expression's character is "?". The K index is considered matched if all characters are equal. Therefore, in this example K=53 is considered equal to "?01?010".

In one embodiment the step of searching comprises the steps of creating a result bitmap of length N having each of its bits from I=1 to I=N set true, dividing the query word into J groups of B characters, each of the J groups having a query value, determining, for J=1 to J=W/B, an intersection between the result bitmap and the bitmap in the entry corresponding to the $J^{th}$ query value in the $J^{th}$ lookup table, and retrieving the set of regular expressions from I=1 to I=N that correspond to the bits from I=1 to I=N in the result bitmap that are set true. Preferably, the step of determining the intersection between the result bitmap and the bitmap in the entry corresponding to the $J^{th}$ query value in the $J^{th}$ look-up table comprises the steps of calculating a logical AND between the result bitmap and the bitmap in the entry corresponding to the $J^{th}$ query value in the $J^{th}$ lookup table, and storing a result of the step of calculating in the result bitmap.

In an embodiment of the present invention, the step of selecting the base B from 1 to W comprises the step of selecting the base B to minimize a time required to perform the step of searching each lookup table to determine the set of regular expressions that match the query word. Preferably this step selects B to be equal to W. Alternatively, the step of selecting the base B from 1 to W comprises the step of selecting the base B to minimize an amount of memory required to store the J lookup tables. In an embodiment this step selects B to be equal to 1. In a still further embodiment, the step of selecting the base B from 1 to W comprises the step of selecting the base B to balance a memory storage space versus search time inverse relationship for a particular application.

In an alternative embodiment of the present invention, a computer-readable medium having computer-executable instructions for performing steps is presented. The steps comprise selecting a base B from 1 to W to divide words of length W into J=W/B groups, and creating a lookup table for each of the J groups. The lookup table for each of the J groups have K=$L^B$ entries, where L is the number of characters in a language of the words. Preferably, each of the K entries are a bitmap of length N corresponding to a number of regular expressions. The steps also include seeding each lookup table for each regular expression from I=1 to I=N, and searching each lookup table to determine a set of regular expressions that match a query word.

Preferably, the computer-executable instructions for seeding comprise the steps, for each regular expression from I=1 to I=N, for each lookup table from J=1 to J=W/B, for each entry from K=1 to K=$L^B$, of setting an $I^{th}$ bit in the bitmap in the $K^{th}$ entry true when a value of the $J^{th}$ group of the $I^{th}$ regular expression matches K or when the value of the $J^{th}$ group of the $I^{th}$ regular expression is equal to '?'. Further, when the regular expression is comprised of a word and a mask, the computer-executable instructions for seeding comprise the steps, for each regular expression, for each lookup table, for each entry, of setting an $I^{th}$ bit in the bitmap in the $K^{th}$ entry true when a value of the $J^{th}$ group of the $I^{th}$ regular expression and its mask matches K and when the value of the $J^{th}$ group of the $I^{th}$ regular expression and its mask is equal to '?'.

In one embodiment the computer-executable instructions for searching comprise the steps of creating a result bitmap of length N having each of its bits from I=1 to I=N set true, dividing the query word into J groups of B characters, each having a query value, determining, for J=1 to J=W/B, an intersection between the result bitmap and the bitmap in the entry corresponding to the $J^{th}$ query value in the $J^{th}$ lookup table, and retrieving the set of regular expressions from I=1 to I=N that correspond to the bits from I=1 to I=N in the result bitmap that are set true. Further, the computer-executable instructions for determining the intersection between the result bitmap and the bitmap in the entry corresponding to the $J^{th}$ query value in the $J^{th}$ lookup table comprises the steps of calculating a logical AND between the result bitmap and the bitmap in the entry corresponding to the $J^{th}$ query value in the $J^{th}$ lookup table, and storing a result of the step of calculating in the result bitmap.

In a further embodiment of the present invention, a computer-readable medium having stored thereon a first number J of data structures is presented. This first number J corresponds to a division of a fixed word length W required by a language by a selected base B. Each data structure has a second number of data fields K corresponding to a third number L of different characters in the language raised to the power of the selected base B. Each data field contains a bitmap of length N, where N is equal to a fourth number of regular expressions. In one embodiment each bit of the bitmap in each data field is set false. Further, for each regular expression from I=1 to I=N, for each data structure from J=1 to J=W/B, for each data field from K=1 to K=$L^B$, the $I^{th}$ bit in the bitmap in the $K^{th}$ data field is set true when a value of the $J^{th}$ group of the $I^{th}$ regular expression matches K or when the value of the $J^{th}$ group of the $I^{th}$ regular expression is equal to '?', where '?' equals any single character in the language.

In one embodiment the base B is selected to be equal to 1 to minimize an amount of memory required to store the data structures. Alternatively, the base B is selected to be equal to W to maximize an amount of memory required to store the data structures. Further, the amount of memory required to store the data structures is at least equal to $(W/B)L^B N$.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
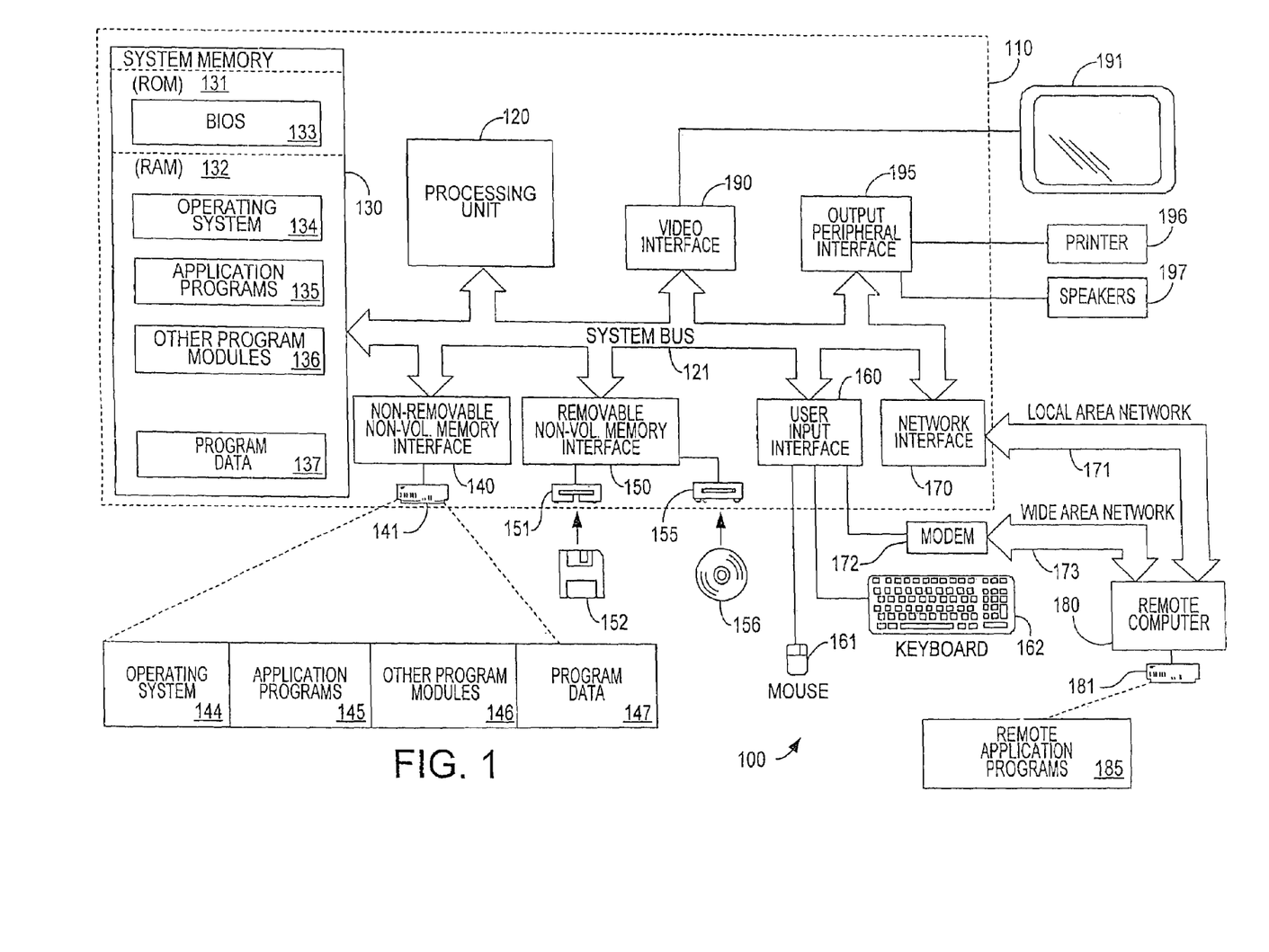
FIG. 1 is a block diagram generally illustrating an exemplary computer system on which the present invention may reside.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

As discussed above, the method and data structures of the present invention find particular applicability in computing devices that are required to find and apply an appropriate rule or policy under certain circumstances or to meet appropriate criteria. Such devices include, but are not limited to, network gateways, firewalls, proxy servers, network address translators (NAT), or other devices that use routing tables or policy rules that are applied to packets passed therethrough. However, the methods and data structures of the present invention also find applicability in computing devices that need to perform efficient searches based on a search criteria, and in which the efficiency relates to either storage space or search time, or both. Despite this broad applicability of the methods and data structures of the present invention, the following description will provide working examples to aid in the understanding of the present invention. While these working examples will, in the interests of brevity, only describe a single operating environment, to wit a routing table example, such examples shall not be taken as limiting the scope of the invention in any way.

As will become apparent from the following description, the methods and data structures of the present invention are particularly well suited for computer environments that use a language of fixed word length, and in which a set of regular expressions are composed from the language's alphabet and the "?", i.e. any single character. In this computing environment the set of regular expressions are associated with or are applied to particular words of the fixed word length. The methods and data structures of the present invention are used to return the set of matching regular expressions for a given query word.

In a routing table implementation, the fixed word length may be 32 bits, corresponding to the binary implementation of a source IP address, destination IP address, etc. The regular expressions, therefore, may be the rules that apply to govern the processing of packets from a given source or particular destination addresses. Once the given routing rules or regular expressions have been determined and associated with the criteria of source address or destination address, they are stored in a database for retrieval and application to packets that are received or that are to be processed through the network device. The methods and data structures of the present invention, therefore, are used to provide an efficient searching mechanism to locate the appropriate set of rules or regular expressions to be applied to any and all packets received at the network device.

Figure 2:
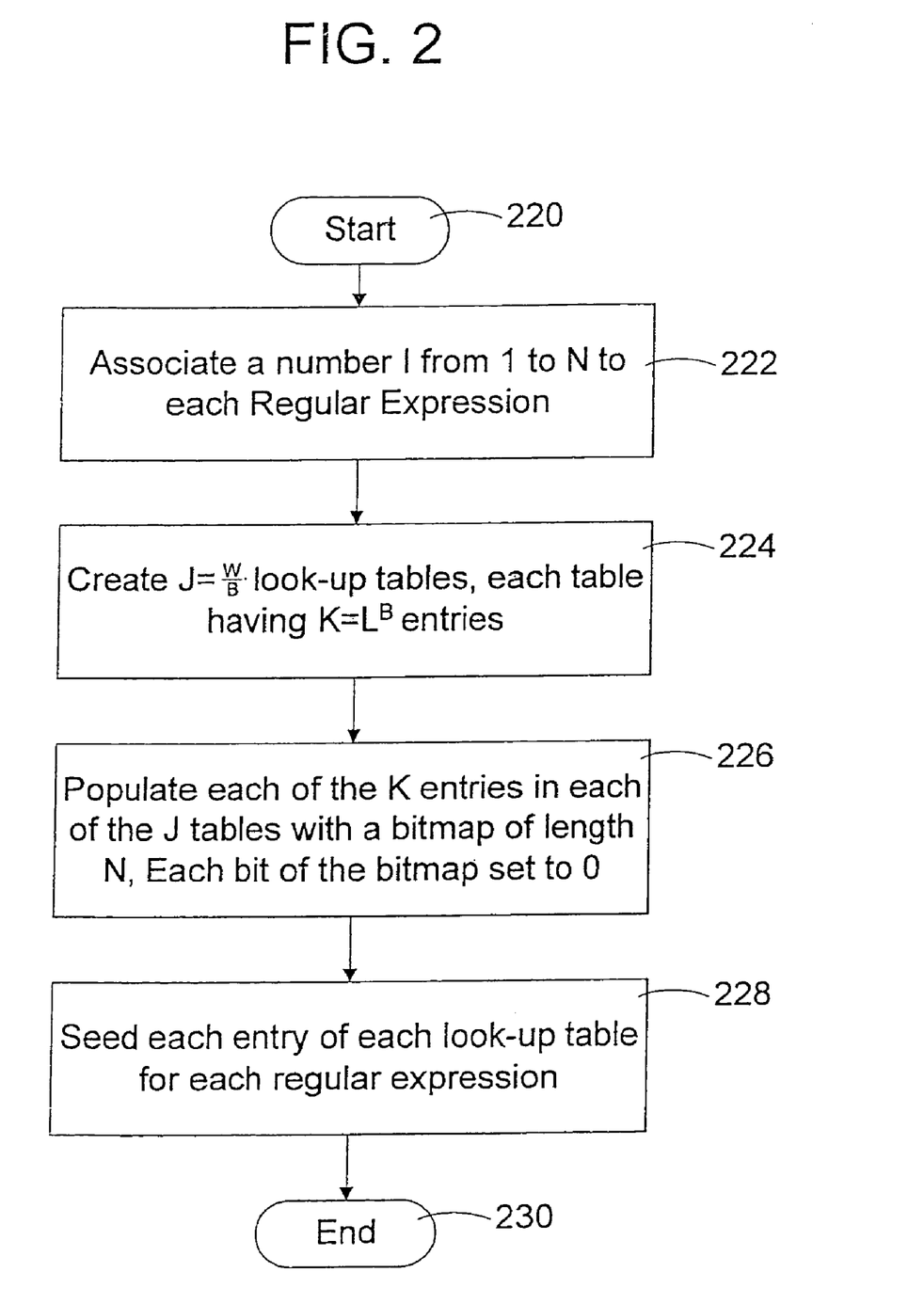
FIG. 2 is a simplified flow diagram illustrating an initialization phase of the method of the present invention.

Once the regular expressions or policy rules have been written, the method of the present invention operates in an initialization phase to generate a number of data structures that will be used for the efficient searching for the set of matching regular expressions for each particular packet. A simplified flow diagram of this initialization phase is illustrated in FIG. 2 to which specific reference is now made. Once the initialization phase has begun 220, the method operates to associate a number I from 1 to N to each regular expression to be applied by the routing table as illustrated as step 222. The method then operates to create the lookup tables that will be used during the searching phase of operation to find the appropriate or matching regular expressions for the query criteria extracted from the packets. Specifically, as illustrated as step 224, the method of the present invention creates a number of lookup tables J which is equal to the fixed word length W divided by a base number B. This base number B is a number that is used to split the word into groups of B successive characters. Each of these groups are then given their own lookup table, resulting in a total of J=W/B lookup tables. The decision process and trade-offs associated with the selection of any particular number for B will be discussed more fully below. Each of the J lookup tables has a number of entries K equal to the number of characters in the particular alphabet L raised to the power B, i.e. $K=L^B$. For example, if the alphabet is binary, L=2.

In step 226 during this initialization phase, the method of the present invention populates each of the K entries in each of the J lookup tables with a bitmap of a length N equal to the number of regular expressions existing in the system. Each bit of these bitmaps are then set to zero (0). Once these lookup tables have been generated, the method at step 228 seeds each entry of each lookup table for each regular expression before this initialization phase ends at step 230.

Figure 3:
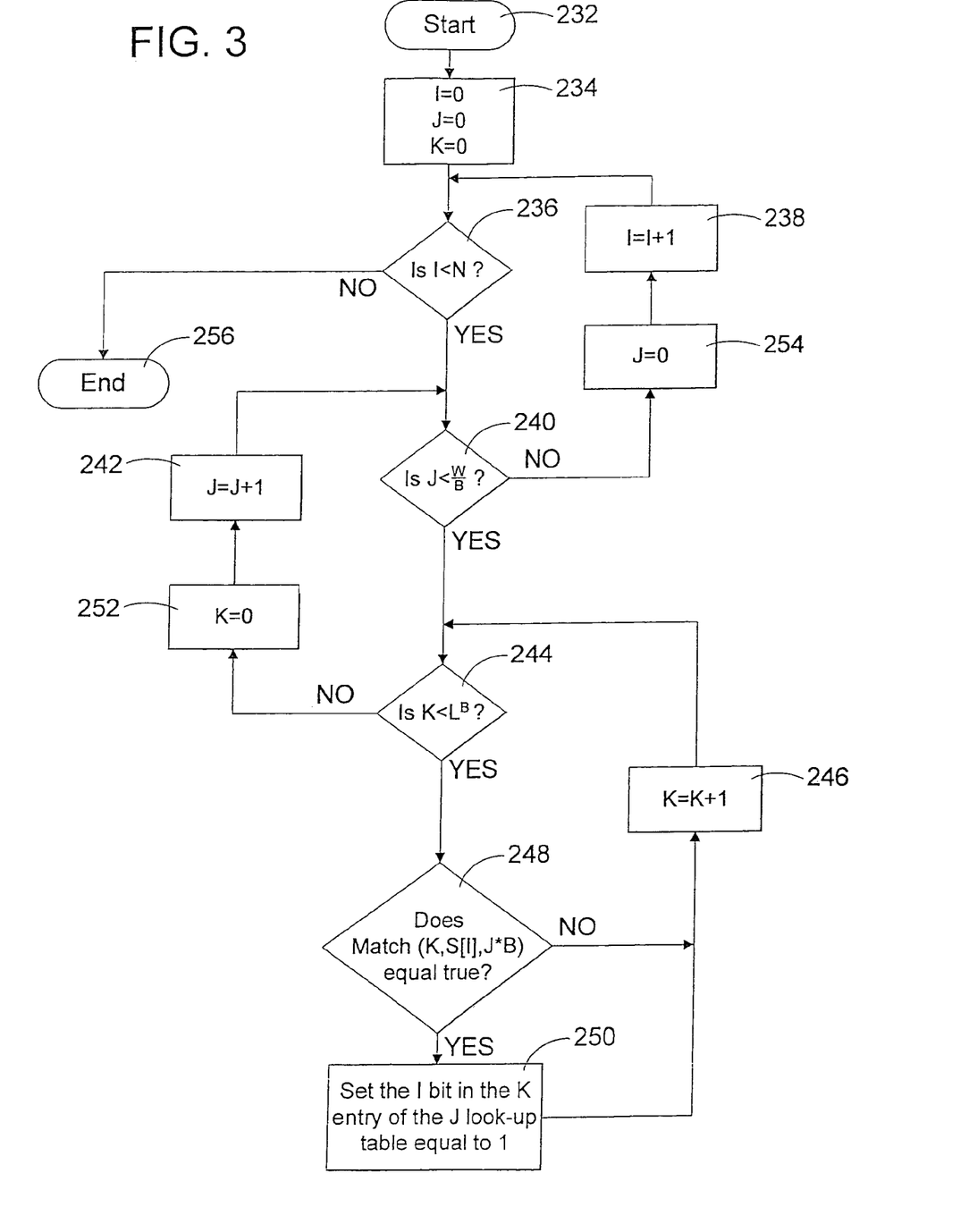
FIG. 3 is a simplified flow diagram illustrating a seeding method of an embodiment of the present invention.

The seeding process of the initialization phase is illustrated in the simplified flow diagram of FIG. 3. Once the seeding process begins 232, the variables I, J, and K are all initialized at step 234. The decision block 236 controls the selection of the regular expressions for the seeding process. Specifically, decision block 236 and its associated indexing step 238 proceeds to select each regular expression in turn for the appropriate seeding of the lookup tables. Decision block 240 controls the selection of each of the lookup tables in turn for the seeding process for each regular expression. The indexing step 242 operates to index to the next lookup table once the seeding of the current lookup table has been completed. Decision block 244 controls the sequential selection of each of the individual entries of the current lookup table for potential seeding for the currently selected regular expression. Similarly, the indexing step 246 indexes to the next entry in the lookup table for potential seeding.

The actual seeding takes place as a match function illustrated as decision block 248. Specifically, the match function determines if the index of the current entry is equal to the value of the current group of length B of the regular expression or the "?" character. That is, the match is done by converting the K index to a word of B characters representing the K number. As an example, assume that K is 53, B is 8, and the alphabet is {0, 1}. This conversion results in "00110101." Now, the method takes the B characters in the $I^{th}$ regular expression starting from the J*B character. In the first iteration the method will take the first B characters, the next iteration will take the next group of B characters, etc. If the regular expression is "?01?010" then the matching is performed by comparing each character in the K conversion with the corresponding character from the regular expression. In this particular example the following comparisons are made:

1. ('0'=='?')
2. ('0'=='0')
3. ('1'=='1')
4. ('1'=='?')
5. ('0'=='0')
6. ('1'=='1')
7. ('0'=='0')
8. ('1'=='?')

A character comparison is true either if the characters are equal or if the character from the regular expression is "?". In the above example, the comparisons numbered 2, 3, 5, 6, and 7 are considered equal because the characters are equal, and the comparisons 1, 4, and 8 are equal because the regular expression's character is "?". The K index is considered matched if all characters are equal. Therefore, in this example K=53 is considered equal to "?01?010".

If either of these two criteria is satisfied, then the step 250 sets the I bit in the K entry of the J lookup table equal to 1. Otherwise, that bit is not changed from its initialized value of zero (0). Once the determination is made, the indexing step 246 indexes to the next entry in the current lookup table for potential seeding. This looping function continues until each of the entries in the current lookup table has been processed.

At this point, the decision block 244 will no longer be true, and therefore will branch to steps 252 and 242 to move to the next lookup table. Specifically, step 252 will reset the entry value to the initial entry in the lookup table while step 242 will index the system to the next lookup table. Assuming that such a next table exists, the processing will move from decision block 240 to decision block 244 to once again calculate the matching function 248 for each entry in the lookup table. If, however, the last lookup table has been reached, decision block 240 will loop to steps 254 and 238. Specifically, step 254 will reset the process to the first lookup table while step 238 will index the system to the next regular expression for appropriate seeding. Assuming that another regular expression exists, the processing will continue through decision block 236, 240, to 244 for processing of each of the entries in the selected lookup table. This looping through each of the entries in each of the lookup tables will continue for each of the regular expressions until all of the seeding is accomplished, at which point decision block 236 ends the process at step 256.

Once this initialization phase has been completed, the method of the present invention may be utilized to efficiently find all of the regular expressions that are associated with or which match a given search criteria. Specifically, as illustrated in the simplified flow diagram of FIG. 4, the searching process begins 258 by creating a result bitmap having a length N equal to the number of regular expressions in the system at step 260. This result bitmap is initialized at step 262 by setting all of the N bits to 1. An intersection is then calculated between the result bitmap and the bitmap in the particular entry of each of the lookup tables corresponding to the value of the B length segment of the query word. As illustrated at step 264, the intersection section between the bitmaps results in the performance of a logical AND operation between the result bitmap and the bitmap in the |Q[B(i*B)]| entry of the currently selected and corresponding lookup table. Specifically, in this application the expression |Q[B(i*B)]| signifies that the method gets the word of B characters from the query word starting at the (i*B) character (where i starts from zero and be increased for each iteration). This word is then converted to its corresponding index number, according to the alphabet.

Figure 4:
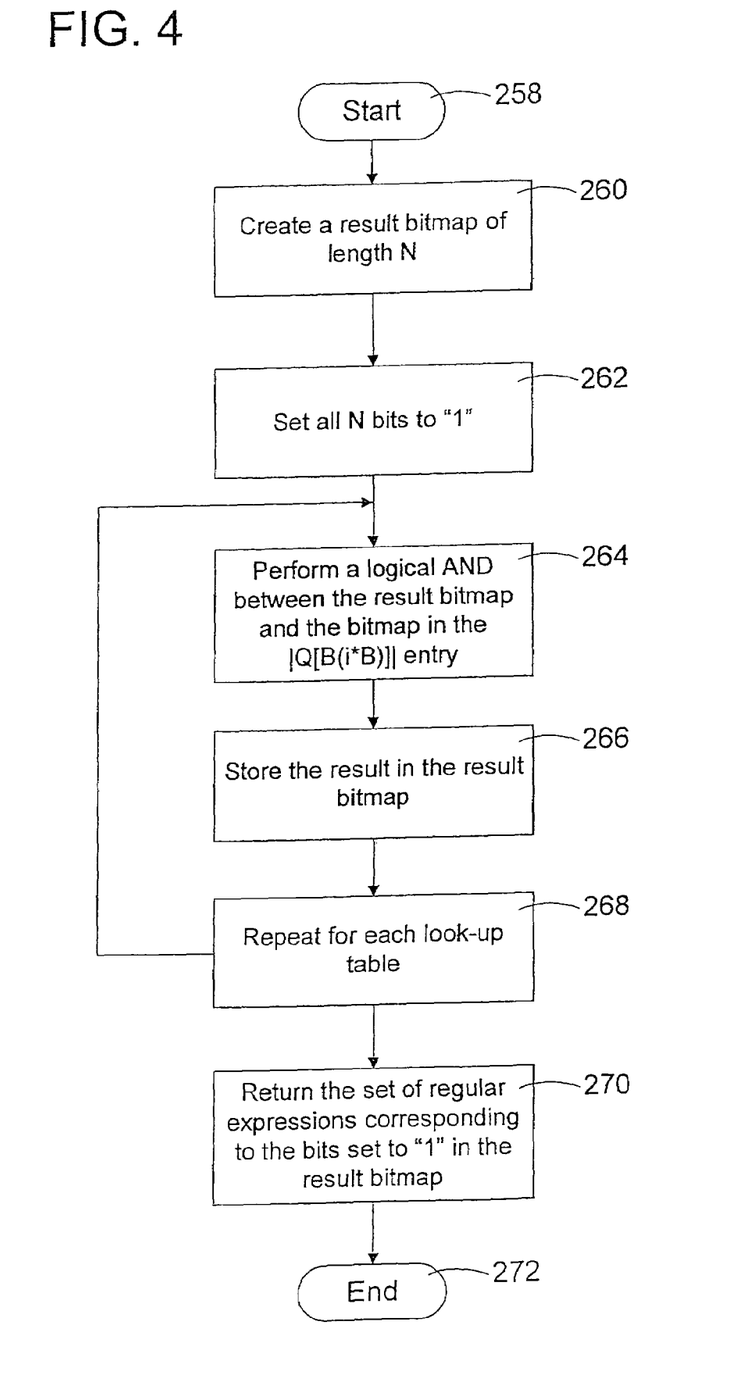
FIG. 4 is a simplified flow diagram illustrating a search phase of the embodiment to the present invention.

For example, in the alphabet {0,1}, assuming B=8 and a query word "00101010101000101001001010101100", in the first iteration the method obtains "00101010" and the index is 42. In the second iteration, the method obtains "10100010" and the index is 162. In the third iteration, the method obtains "10010010" and the index is 146. Finally, in the fourth iteration, the method obtains "10101100" and the index is 172.

The result from this logical AND operation is then stored at step 266 in the result bitmap. As indicated at step 268, this process is repeated for each lookup table using the current state of the result bitmap in each successive logical AND operation. Once each of the logical AND operations have been completed for each of the lookup tables, the method of the present invention returns the set of regular expressions that correspond to the bits that remain set to "1" in the result bitmap at step 270. At this point the search process is complete 272.

With an understanding of the initialization and search phases of the method of the present invention now firmly in hand, the discussion turns to the space versus time trade-off that results from the selection of the variable B described above. Recognizing that the number of lookup tables J=W/B, that each of these J lookup tables includes $K=L^B$ entries, and that the number of bits in each bitmap occupying each entry is equal to N, the space required for the storage of the lookup table data structures is equal to J*K*N or $(W/B)(L^B)(N)$. In order to find the optimal B such that the amount of space required to store the data structures of the present invention, the differential of the space equation according to B variable should be zero:

$$(\text{Space})' = 0 \Rightarrow$$

$$\left(\frac{W}{B}L^B N\right)' = 0 \Rightarrow$$

$$WN\left(\frac{L^B}{B}\right)' = 0 \Rightarrow$$

$$\left(\frac{e^B}{B}\right)' = 0 \Rightarrow$$

$$\frac{e^B B - e^B}{B^2} = 0 \Rightarrow$$

$$e^B B = e^B \Rightarrow$$

$$B = 1$$

Since the differential is always greater than zero (0), it may be seen that the space equation is monotonically increasing with increases in the value of B. That is, the minimal amount of space will be required by the data structures of the present invention when B is selected to be equal to one (1), and will increase as B is increased. This may be seen directly from an examination of the data structures illustrated in FIGS. 5-8. Specifically, the size required to store the data structures of FIG. 5 where B is selected to be equal to one (1) in an environment where the word length W is equal to 32 (e.g. an IP address), the alphabet is binary (L=2), and where there are 2 regular expressions (N=2), is 32*2*2=128 bits or 16 bytes of memory. In the data structures of FIG. 6, the required space when B is selected to be equal to eight (8) is 4*256*2=2,048 bits or 256 bytes of memory. As B is increased to sixteen (16), the number of look-up tables is reduced to two (2) as illustrated in FIG. 7, but the amount of space required to store these two look-up tables is increased to 262,144 bits or 32 kilobytes of memory. Finally, if B is increased to be equal to the word length, in this case 32, there is only one lookup table required, however the space required to store this one lookup table is 8,589,934,592 bits ($1*2^{32}*2$), which equals one gigabyte of storage space.

The trade-off with respect to the amount of time required to complete the search and location operation of the present invention based on the selection of the variable B must also be considered. Specifically, the total search time is dependent on the time required to perform the logical AND function times the total number of lookup tables for which the logical AND operation must be performed, or total search time equals (W/B)(A) where A equals the amount of time for each logical AND operation. From this equation it can be seen that the total search time decreases as the value of B increases. Since B must be selected to be a natural number between 1 and W, the shortest search time is achieved when B is selected to be equal to W. That is, the shortest search time is achieved when there is only one lookup table, and therefore one logical AND operation to be performed.

From the above it may be seen that there is a trade-off between the storage space required for the data structures of the present invention resulting from the selection of B versus the time that it takes to search these data structures. The larger the value for B, the larger the space and the smaller the time, and vice versa. Therefore, the particular selection of a value of B may be tuned for particular applications to satisfy the throughput time requirements with the available space that may be utilized for storage of the data structures.

To illustrate the principles described above, the following will provide an example that demonstrates how the method of the present invention behaves on a sample routing table. In this example the alphabet is binary (L=2). In a typical routing table, the route entries are written in the common IP address way that is represented by a dotted quad of format X.X.X.X. With such IP addresses, the fixed word length for the routing table example is 32 bits (W=32). In the following examples, the routing table contains the following entries: 10.76.76.0 mask 255.255.255.0 (A.4C.4C.0 mask FF.FF.FF.0); and 172.31.196.0 mask 255.255.252.0 (AC.1F.C4.0 mask FF.FF.FC.0). In such a routing table example, a query word will be in the form of X.X.X.X (32 bit), and the result will be the set of matching route entries. However, this is only a notation used to make the expression more readable herein. This IP/mask notation can be converted to the regular expression. For example, the expression "00001010.01001100.01001100.00000000" mask "11111111.11111111.11111111.00000000" can be written as "000010100100110001001100????????".

Figure 5:
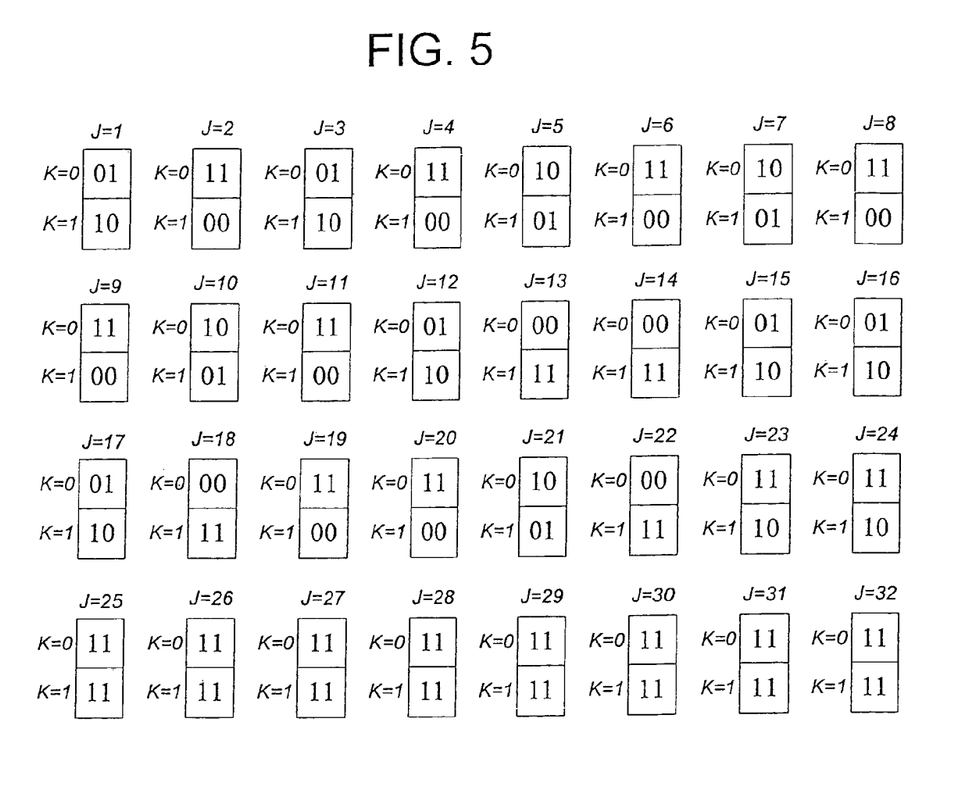
FIG. 5 is a simplified data structure diagram illustrating an example of the lookup tables generated and utilized by the method of the present invention.

In the first example of the data structures created through the method of the present invention illustrated in FIG. 5, the value of B is selected to be equal to one (1). As such, the number of data structures or lookup tables that are created is equal to 32, with each lookup table being associated with a single bit in the 32 bit word. As indicated above, the routing table contains the entry 10.76.76.0 mask 255.255.255.0. Written in binary form this translates to 00001010.01001100.01001100.00000000 mask 11111111.11111111.11111111.00000000. In seeding the 32 lookup tables during the initialization phase, the first 8 lookup tables indicated as J=1 through J=8 in FIG. 5 will correspond with the first 8 bits of the route entry. In the first lookup table J=1, the first bit of the K=0 entry will be set to one (1) since the first bit in the routing table address is equal to zero (0). Likewise, this same bit will be set in each of the next three routing tables as each of the next three bits for this regular expression are zero (0). However, in the fourth lookup table the first bit of the K=1 entry will be set true since the fifth bit of the regular expression is equal to one (1). This bit-by-bit initialization of the lookup tables continues in like fashion until the last eight bits of the regular expression are encountered. This is because the mask value in the last 8 bits allow for all wild cards in those last 8 positions. Therefore, the first bit in each of the entries for the last 8 lookup tables for this first regular expression will be set to one (1) as illustrated.

As the initialization phase proceeds with the second regular expression, the process for seeding each of the bitmaps in each of the lookup tables proceeds in a similar manner to that just discussed. Specifically, the first 8 bits of the second regular expression are equal to 10101100, which results in the second bit of the K=1 entry of the first lookup table being set true, the second bit of the K=0 entry of the J=2 lookup table being set true, etc. This process continues until the twenty-third and twenty-fourth bits are encountered. As indicated above, the third component of the dotted quad address of the second regular expression is equal to 196 mask 252. In binary form this translates to 11000100 mask 11111100. With this mask value ending in two zeros (0), this translates to two wild card characters in the twenty-third and twenty-fourth bit position. As such, the second bit of each of the K=0 and K=1 entries of the twenty-third and twenty-fourth lookup tables are set true. The last 8 bits, and therefore the last 8 lookup tables, are also subject to the mask of zero (0), and therefore both the K=0 and K=1 entries have their second bits set true. At the completion of this process the 32 lookup tables will be initialized as indicated in FIG. 5. As discussed above, the space required for the storage of these 32 data structures is merely 128 bits or 16 bytes of storage.

Figure 6:
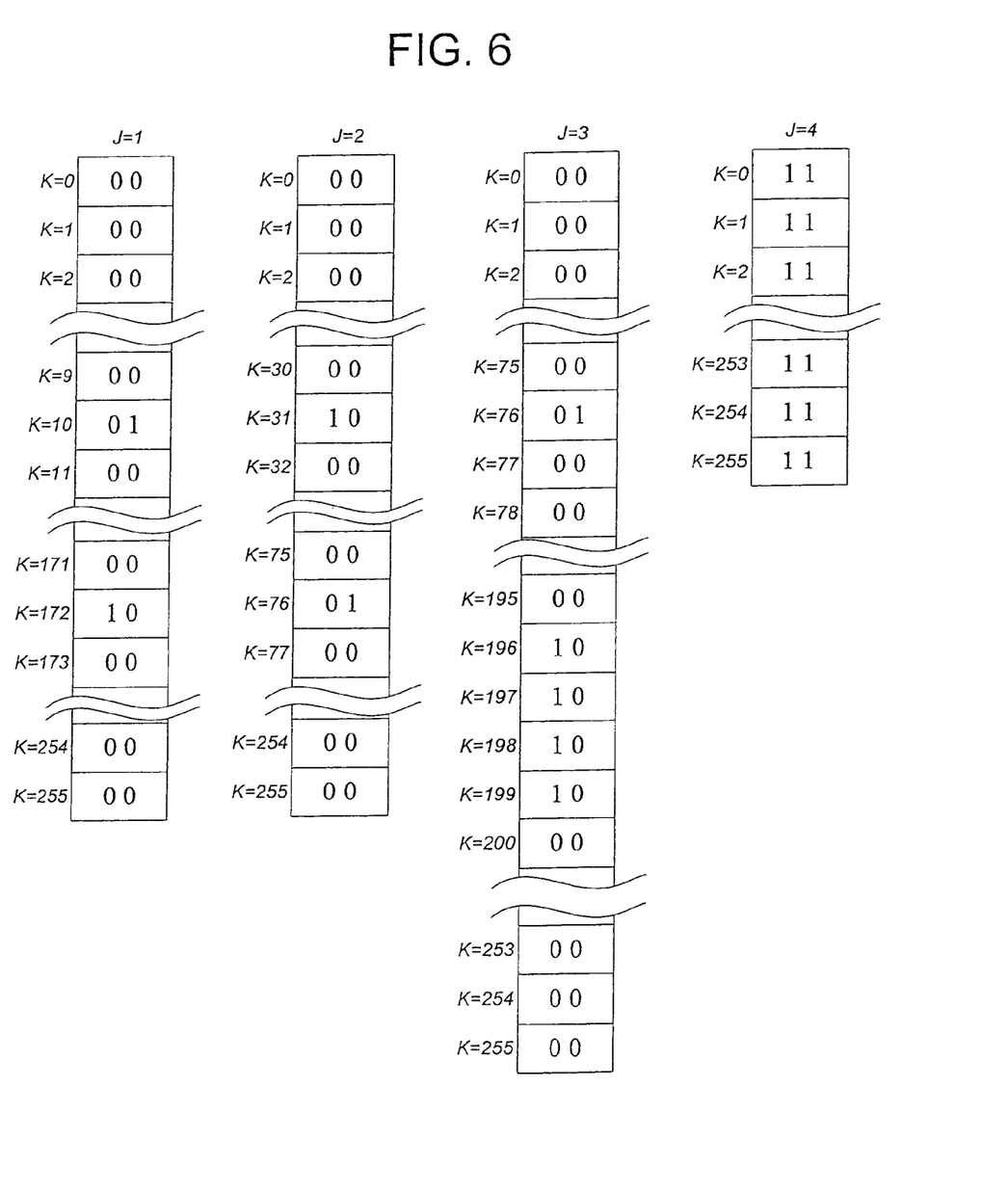
FIG. 6 is a simplified data structure diagram illustrating an alternate embodiment of the lookup tables generated and utilized by the method of the present invention.
Figure 7:
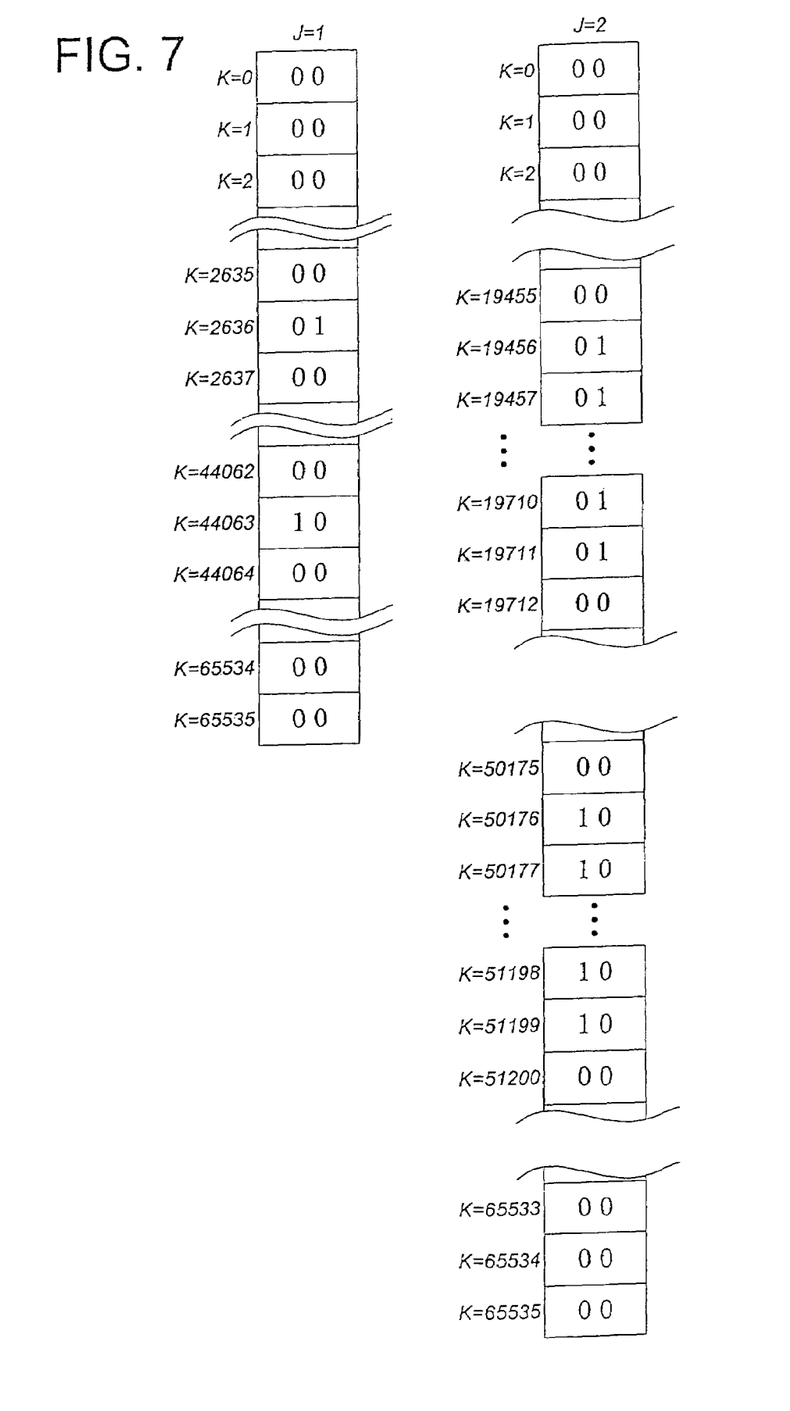
FIG. 7 is a simplified data structure diagram illustrating a further alternate embodiment of the lookup tables generated and utilized by the method of the present invention.

If a different value of B is selected, for example B=8, the data structures illustrated in FIG. 6 are generated by the method of the present invention. Since the word length in this routing table example is 32 bits, the selection of B=8 will result in 4 lookup tables or data structures being generated by the method of the present invention. Each of these 4 data structures will have 256 entries ($L^B$), and each entry will contain a bitmap of length 2 in view of the 2 regular expressions in this example. As discussed above, all of the bits of the bitmaps in each of the entries of each of these lookup tables is initially set to zero (0). Therefore, to simplify the illustration of FIG. 6, breaks in lookup tables are included where the individual entries there between merely contain bitmaps with each bit set to its initial value of zero (0).

During the initialization phase, the regular expression is divided into four groups, which happen to correspond with the dotted quad notation of the IP addresses which simplifies this discussion. Specifically, the initialization of the first lookup table for the first regular expression sets the first bit in the bitmap true in the K=10 entry. The second lookup table is initialized by setting the first bit in the seventy sixth entry true, which is likewise set for the third lookup table. In the fourth lookup table, the value of zero (0) in the regular expression with a mask of zero (0) will result in the first bit of each entry being set true.

The initialization for the second regular expression proceeds in similar fashion with the second bit of the bitmap in entry K=172 being set true for the first lookup table. In the second lookup table the second bit in the bitmap in the K=31 entry is set true. In the third lookup table, the value of 196 with a mask value of 252 will result in the second bit of each of the bitmaps in the entries K=196 through K=199 being set true. The mask value of zero (0) for the last lookup table will operate similarly resulting in the second bit of each of the bitmaps in the entries from K=0 to K=255 will be set true. As may be seen from this FIG. 6, the required storage space corresponding to this selection of the value of B equals 2,048 bits or 256 bytes of storage. While this is a larger requirement than the first example illustrated in FIG. 5, the search time will be greatly reduced as only 4 logical AND operations must be performed as compared with 32 for the embodiment illustrated in FIG. 5.

This search time can be cut in half by the selection of the value for B being equal to 16. The resulting data structures or lookup tables for such a selection for the value of B are illustrated in FIG. 7. In this FIG. 7 the initialization phase proceeds in similar matter to that described above, recognizing that now the regular expressions will be divided into two groups of 16 bits each. The seeding of the first lookup table is relatively straight forward as the mask value for this first group of 16 does not result in any wild cards. However, the seeding of the second lookup table does include a wild card. Specifically, the first regular expression only includes wild cards in the last 8 bits of the second grouping of 16. To aid in the understanding of this concept the regular expressions are written in octal format as 0A.4C.4C.00 mask FF.FF.FF.00 and AC.1F.C4.00 mask FF.FF.FC.00. As such, the last 16 bits of the regular expression and its mask for the first regular expression requires that the bits from 0x4C00 through 0x4CFF be set true. This corresponds to the first bit of each of the bitmaps in the entries K=19456 through K=19711 being set true. However, the second regular expression, taking its mask into consideration, requires that the second bit in each of the bitmap entries from 0xC400 through 0xC7FF, or entries K=57176 through K=51199 be set true. All of the other bits in the bitmap entries for each of these lookup tables remain in their un-set or zero (0) initialized positions. While the amount of time to search these two lookup tables is less than the proceeding examples, the amount of space to store these two lookup tables expands to 262,144 bits or 32 kilobytes of storage.

Figure 8:
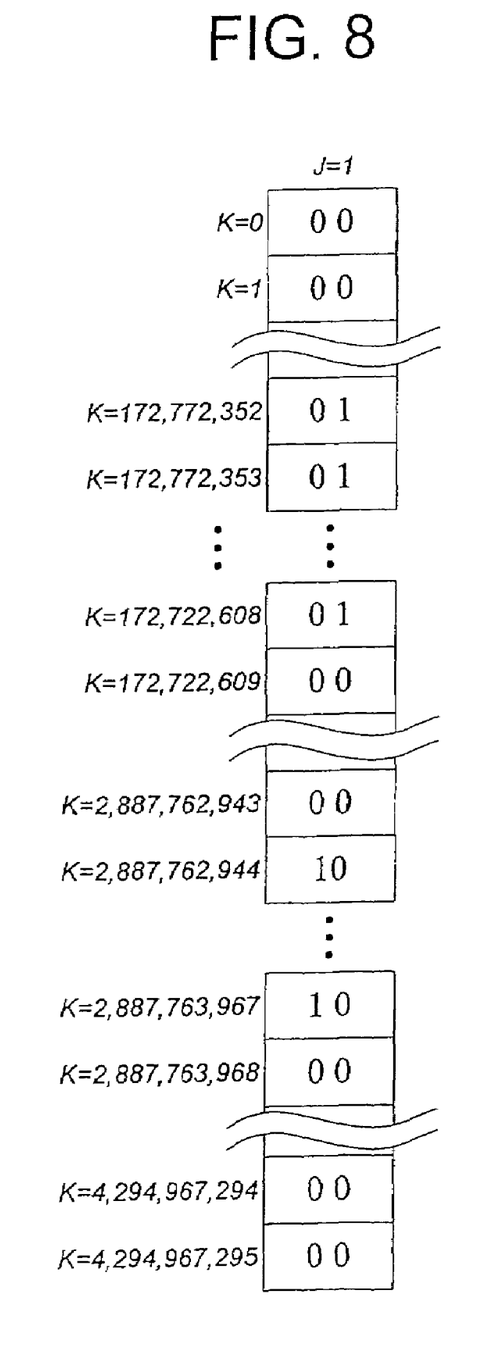
FIG. 8 is a simplified data structure diagram illustrating a still further embodiment of a lookup table generated and utilized by the method of the present invention.

As the selection of the value for B is taken to its other extreme, that is B=1, only a single lookup table is required. However, this single lookup table includes $2^{32}$ entries, each of which holds a bitmap of length 2, resulting in a storage space of one gigabyte of memory. That is, this single lookup table, while requiring only a single logical AND operation, provides a single entry for each and every IP address. The seeding of this single data structure is accomplished as discussed above taking into account the mask values for each of the two regular expressions.

Figure 9:
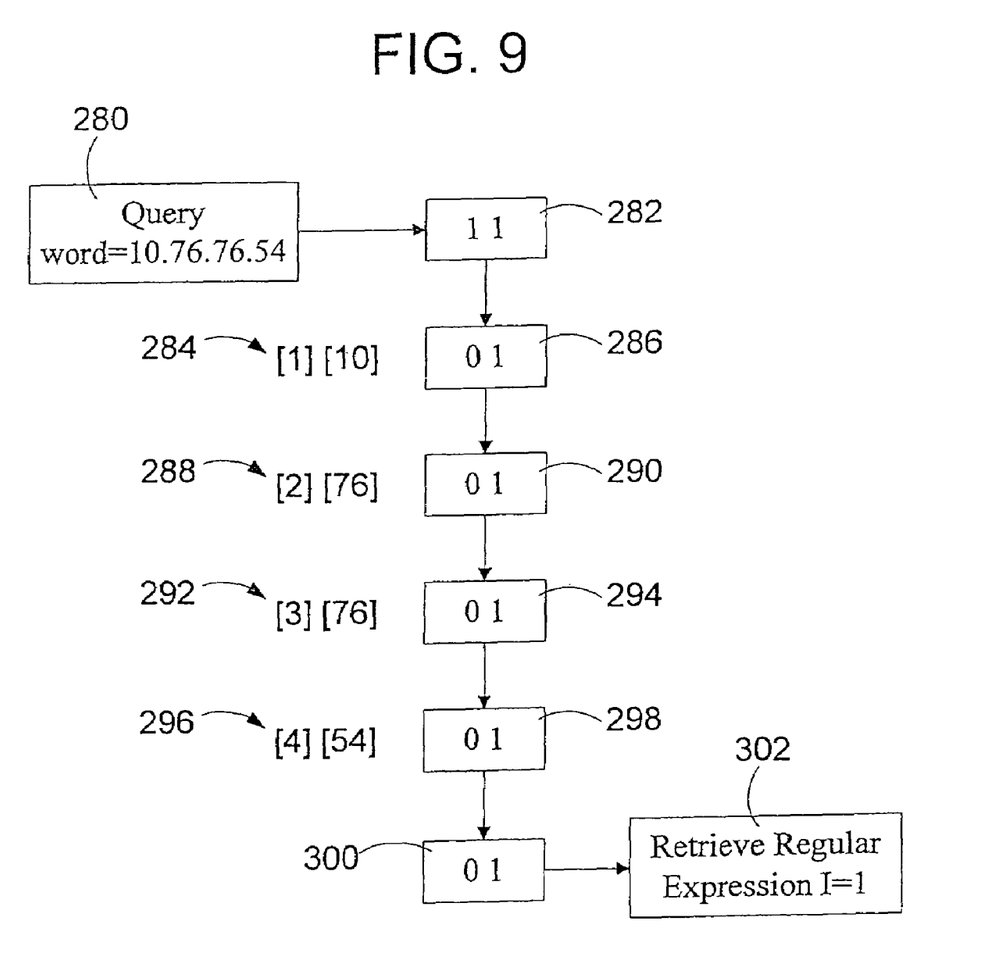
FIG. 9 is a simplified flow diagram illustrating the search phase of the method of the present invention as associated with lookup tables of FIG. 6.

Once the initialization process discussed above has been completed, the search phase of operation of the method of the present invention may commence. As discussed above, this search phase of operation begins by constructing a result bitmap of length N equal to the number of regular expression existing in the system. For the routing table example, this value is equal to 2. As illustrated in FIG. 9, the method of the present invention receives a query word 280, that may be for example the source IP address of a packet to be routed by the routing table. The method then generates the result bitmap 282 with each of the 2 bits set true. To simplify the discussion of this search phase of operation, assume that the value of B is set to 8. As such, the lookup tables illustrated in FIG. 6 will be utilized for this exemplary discussion. However, the same principles reply regardless of the selection of the value of B.

Assuming that the query word is 10.76.76.54, the first logical AND operation will take place between the result bitmap 282 and the bitmap in the K=10 entry of the first lookup table indicated generally by the representation at 284. The result of this logical AND is then stored in the result bitmap 286. As indicated next generally at 288, the result bitmap 286 is logically ANDed with the K=76 entry of the J=2 lookup table. The result of this logical AND operation is stored in the result bitmap 290. This result bitmap 290 is then logically ANDed with the K=76 entry of the J=3 lookup table as indicated generally at 292. The result of this logical AND operation is stored in the result bitmap 294. Finally, this result bitmap 294 is logically ANDed with the K=54 entry of the J=4 lookup table as indicated at 296. The result of this logical AND operation is stored in the result bitmap 298. As this is the last lookup table, this final result bitmap 300 is analyzed to determine which if any of the regular expressions match the query word. As indicated at step 302, the analysis of this result bitmap 300 results in the retrieval of only the first regular expression.

Figure 10:
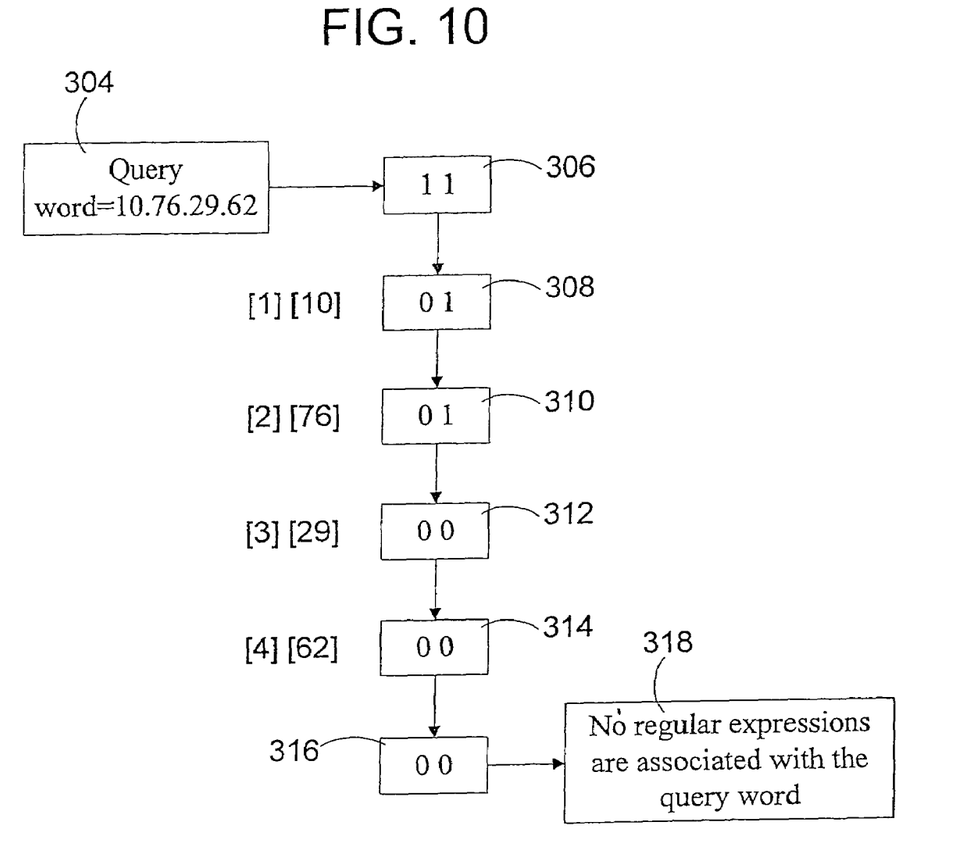
FIG. 10 is a simplified flow diagram illustrating the search phase of the method of the present invention as associated with the lookup tables of FIG. 6 for a different query word.

However, as illustrated in FIG. 10, if a query word 10.76.29.62 is received as indicated at 304, the outcome of the logical AND operations will be different. Specifically, the result bitmap is created 306 with each of the bits in the bitmap being set true. The first logical AND operation with the K=10 entry of the J=1 lookup table will indicate a match with the first regular expression, and therefore result in the result bitmap 308. Likewise, the second logical AND operation with the K=76 entry of the J=2 lookup table will match the first regular expression, and therefore result in the result bitmap 310. However, the third logical AND operation with the K=29 entry of the J=3 bitmap will not match either the first or the second regular expression, and therefore result in the result bitmap 312. While one embodiment of the present invention will continue to perform the fourth and final logical AND operation with the K=62 entry of the J=4 lookup table resulting in the result bitmap 314, an alternate embodiment of the present invention may truncate this additional logical AND operation since the result bitmap has been reduced to all zeros (0), indicating that none of the regular expressions match the query word. In either embodiment, the final result bitmap 316 will be analyzed to determine which, if any regular expressions match the query word. In this example, block 318 indicates that no regular expressions are associated with the query word.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

The invention claimed is:

1. In a language using an alphabet having a first number of characters L forming words of a fixed length W, and a second number N of regular expressions composed only from the characters in the alphabet and the '?' sign, a system for finding a set of matching regular expressions associated with a given query word, comprising:
  a processor;
  a memory; and
  logic configured to select a base B from 1 to W to divide the words of length W into J=W/B groups;
  logic configured to create a lookup table for each of the J groups, the B lookup table for each of the J groups having K=$L^B$ entries, each of the K entries being a bitmap of length N;
  logic configured to seed each lookup table for each regular expression from I=1 to I=N; and
  logic configured to search each lookup table to determine the set of regular expressions that match the query word.

2. The system of claim 1, wherein the logic configured to seed comprises logic configured to, for each regular expression from I=1 to I=N, for each lookup table from J=1 to J=W/B, for each entry from K=1 to K=$L^B$, set an $I^{th}$ bit in the bitmap in the $K^{th}$ entry true when a value of the $J^{th}$ group of the $I^{th}$ regular expression matches K and when the value of the $J^{th}$ group of the $I^{th}$ regular expression is equal to '?'.

3. The system of claim 2, wherein the regular expression is comprised of a word and a mask, and wherein the logic configured to seed comprises logic configured, for each regular expression from I=1 to I=N, for each lookup table from J=1 to J=W/B, for each entry from K=1 to K=$L^B$, to set an $I^{th}$ bit in the bitmap in the $K^{th}$ entry true when a value of the $J^{th}$ group of the $I^{th}$ regular expression and its mask matches K and when the value of the $J^{th}$ group of the $I^{th}$ regular expression and its mask is equal to '?'.

4. The system of claim 1, wherein the logic configured to search comprises logic configured to:
  create a result bitmap of length N having each of its bits from I=1 to I=N set true;
  divide the query word into J groups of B characters, each of the J groups having a query value;
  determine, for J=1 to J=W/B, an intersection between the result bitmap and the bitmap in the entry corresponding to the $J^{th}$ query value in the $J^{th}$ lookup table; and
  retrieve the set of regular expressions from I=1 to I=N that correspond to the bits from I=1 to I=N in the result bitmap that are set true.

5. The system of claim 4, wherein the logic configured to determine the intersection between the result bitmap and the bitmap in the entry corresponding to the $J^{th}$ query value in the $J^{th}$ lookup table comprises logic configured to calculate a logical AND between the result bitmap and the bitmap in the entry corresponding to the $J^{th}$ query in the $J^{th}$ lookup table, and store a result of calculating in the result bitmap.

6. The system of claim 1, wherein the logic configured to select the base B from I to W comprises logic configured to select the base B to minimize a time required to search each lookup table to determine the set of regular expressions that match the query word.

7. The system of claim 6, wherein the logic configured to select the base B to minimize a time required to search each lookup table to determine the set of regular expressions that match the query word comprises logic configured to select B to be equal to W.

8. The system of claim 1, wherein the logic configured to select the base B from 1 to W comprises logic configured to select the base B to minimize an amount of memory required to store the J lookup tables.

9. The system of claim 8, wherein the logic configured to select the base B to minimize an amount of memory required to store the J lookup tables comprises logic configured to select B to be equal to 1.

10. The system of claim 1, wherein the logic configured to select the base B from 1 to W comprises logic configured to select the base B to balance a memory storage space versus search time inverse relationship for a particular application.

11. In a language using an alphabet having a first number of characters L forming words of a fixed length W, and a second number N of regular expressions composed only from the characters in the alphabet and the '?' sign, an apparatus for creating a data structure, comprising:
  a processor;
  a memory;
  logic configured to select a base B from 1 to W to divide words of length W into J=W/B groups;
  logic configured to create a lookup table for each of the J groups, the lookup table for each of the J groups having K=$L^B$ entries where L is the number of characters in a language of the words, each of the K entries being a bitmap of length N corresponding to a number of regular expressions;
  logic configured to seed each lookup table for each regular expression from I=1 to I=N; and
  logic configured to search each lookup table to determine a set of regular expressions that match a query word.

12. The apparatus for creating a data structure of claim 11, wherein the logic configured to seed comprises, for each regular expression from I=1 to I=N, for each lookup table from J=1 to J=W/B, for each entry from K=1 to K=$L^B$, logic configured to set an $I^{th}$ bit in the bitmap in the $K^{th}$ entry true when a value of the $J^{th}$ group of the $I^{th}$ regular expression matches K and when the value of the $J^{th}$ group of the $I^{th}$ regular expression is equal to '?'.

13. The apparatus for creating a data structure of claim 12, wherein the regular expression is comprised of a word and a mask, and wherein the logic configured to seed comprises, for each regular expression from I=1 to I=N, for each lookup table from J=1 to J=W/B, for each entry from K=1 to K=$L^B$, logic configured to set an $I^{th}$ bit in the bitmap in the $K^{th}$ entry true when a value of the $J^{th}$ group of the $I^{th}$ regular expression and its mask matches K and when the value of the $J^{th}$ group of the $I^{th}$ regular expression and its mask is equal to '?'.

14. The apparatus for creating a data structure of claim 11, wherein the logic configured to search comprises:
  logic configured to create a result bitmap of length N having each of its bits from I=1 to I=N set true;
  logic configured to divide the query word into J groups of B characters, each of the J groups having a query value;
  logic configured to determine, for J=1 to J=W/B, an intersection between the result bitmap and the bitmap in the entry corresponding to the $J^{th}$ query value in the $J^{th}$ lookup table;
  logic configured to retrieve the set of regular expressions from I=1 to I=N that correspond to the bits from I=1 to I=N in the result bitmap that are set true.

15. The apparatus for creating a data structure of claim 14, wherein the logic configured to determine the intersection between the result bitmap and the bitmap in the entry corresponding to the $J^{th}$ query value in the $J^{th}$ lookup table comprises logic configured to calculate a logical AND between the result bitmap and the bitmap in the entry corresponding to the $J^{th}$ query value in the $J^{th}$ lookup table, and storing a result of calculating in the result bitmap.

* * * * *